2,961,295
PRECIPITATION OF ZINC COMPOUNDS

Richard B. Montgomery, Bethel, Conn., assignor, by mesne assignments, to Sherritt Gordon Mines Limited, Toronto, Canada, a company of Canada No Drawing. Continuation of application Ser. No. 319,781, Nov. 10, 1952. This application July 9, 1957, Ser. No. 670,657

6 Claims. (Cl. 23—61)

This invention relates to a method for the removal of zinc from a zinc ammonium carbonate solution used in a leaching operation. The solution may contain dissolved zinc and at least one additional non-ferrous metal capable of forming a soluble ammonia complex compound, such as copper or nickel or cobalt, and dissolved ammonia in excess of that required to hold said metals in solution. The method involves treating the solution to reduce its ammonia content and then cooling the treated solution to precipitate a zinc carbonate which is substantially free of compounds of other metals which may have been present in the original solution.

Various processes have been proposed for the leaching of scrap metal and low-grade ores to dissolve out their metallic contents. Such processes have been found to be particularly adaptable to the recovery of copper from brass and bronze scrap. However, the ammoniacal leaching solutions employed dissolve out not only the copper content of the source material, but also, particularly in the case of brass scrap, dissolve out with ease substantially all of the zinc in the material. The zinc and copper dissolve out at about the same rate and in the same ratio as the zinc content bears to the copper content in the metallic portion of the scrap. By appropriate adjustment of the copper and ammonium carbonate leach solutions generally employed, a large proportion of the copper content of such liquors can be selectively precipitated in metallic form from the liquor by gas reduction with a reducing gas, such as carbon monoxide or hydrogen, usually at elevated temperatures and pressures, as described in United States patent application Serial No. 276,710, filed March 14, 1952, now Patent No. 2,734,821. The conditions of reduction and the composition of the leach liquor must be carefully controlled in order to obtain a pure product. The liquor remaining after precipitation of a substantial portion of its copper content is recycled back to the leaching tanks and reused as a solvent. But as the liquor is continually recycled, its zinc content becomes greater and greater. Thus, the zinc level may increase to 100 grams or more of zinc per liter of liquor; this results in proportionately decreasing the copper dissolving capacity of the solution and making it more difficult to selectively precipitate a portion of the copper content in pure metallic form by gas reduction. It has also been found that, advantageously, the zinc content in the normal composition of liquor sent to an autoclave for gas reduction to precipitate metallic copper after the leaching operation should not exceed 50 grams per liter, for otherwise copper oxides are formed during the heating-up period and adversely affect the operation and the character of the gas reduction.

It is therefore necessary to either periodically remove part of the zinc content of the entire leach liquor stream, or continually or periodically treat a side stream of the leach liquor to remove at least part of its zinc content. The material so obtained is a valuable side product of such processes and should be sufficiently pure so that it is commercially salable. One method proposed for the recovery of zinc from leach liquor has been to carbonate the leach liquor under controlled conditions with carbon dioxide gas at about 50 pounds per square inch or more superatmospheric pressure. By stopping the carbonation before the saturation point is reached, a product may be obtained which is substantially free of copper carbonate. However, in carrying out this method under certain conditions, substantial quantities of ammonium carbonate are coprecipitated along with the basic zinc carbonate. It has been found to be inconvenient to convert this ammonium carbonate, coprecipitated with the zinc carbonate, into ammonia and carbon dioxide for reformulation into leaching liquors and reuse as carbonating gas.

The method of this invention is adapted to recovering zinc from either pregnant liquor or leach recycle liquors or other leach liquors without simultaneously forming large quantities of ammonium carbonate. Also the zinc carbonate produced by this method is substantially free of compounds of other metals, such as copper, which may have been present in the original solution. Basically, this method involves treating the recycle liquor or pregnant liquor at relatively low temperatures to drive off part of its total ammonia content in order to reduce the solubility of the zinc dissolved in the liquor so that a zinc carbonate, probably a basic carbonate, will precipitate out and thereby separate the zinc from the copper, which will remain in the liquor as a copper ammonium complex. At the same time, reduction of the total carbon dioxide content of the liquor by any percentage substantially greater than the percentage of reduction of the total ammonia level of the liquor is avoided, and, usually more ammonia than carbon dioxide is driven off. The residual ammonia is sufficient to retain in solution any additional metal, such as copper, that may be present, but is insufficient to retain a major portion of the dissolved zinc in solution when the solution is cooled.

The ammonia so driven off constitutes the ammonia from any free ammonium hydroxide in the leach, the ammonia from the thermal decomposition of the ammonium carbonate in the leach liquor and any ammonia released by the thermal decomposition, partial or complete, of the zinc ammonium complex in the leach liquor. It might be added that the method described herein take advantage of the fact that the zinc ammonia complex is less stable than the copper ammonia complex, inasmuch as the former compound is known to break up at a temperature which is only a few degrees less than that at which the copper ammonia complex breaks up.

An advantageous form of treatment of copper leach recycle liquor involves vacuum distilling the liquor until the ammonia and carbon dioxide contents are reduced to within such limits that zinc carbonate is precipitated upon cooling, but copper is not precipitated in amounts over 1%. The carbon dioxide content of the solution may be increased somewhat (perhaps 20 or more grams per liter) by a mild carbonation after removal of part of the ammonia content. However, such carbonation is not essential. In this manner, the solubility of the basic zinc carbonate present or formed in the liquor may be reduced sufficiently so that 30% or more of the zinc content of the liquor is precipitated upon carbonation, cooling not being essential when carbonation is employed. Any subsequent mild carbonation, after the elimination of a substantial amount of the ammonia content by vacuum distillation or otherwise, forms a minimum of ammonium carbonate since the free ammonia in the solution has been largely driven off.

The zinc precipitate which has been so formed may be further purified to eliminate small amounts of copper and other elements, and again precipitated by this same method. In this case the zinc carbonate cake is washed in the filter, then it may be used as is or after drying or after a light calcination. It may be dissolved in an ammonia or ammonia-ammonium carbonate solution of suitable composition, then metallic zinc may be added to cement out the small amounts of metallic impurities and leave as the only metallic component of the solution the zinc ammonium carbonate. Whether or not cementation is employed, the solution may be subjected to this process of vacuum distillation to precipitate a high purity compound of zinc.

Since this method may be used to refine high zinc scrap, with low concentrations of copper and other metallic elements present, it can readily be seen that the method is applicable when ammonium carbonate liquors are used for leaching of zinc or zinc alloy scraps, wherein large concentrations of copper are not developed.

In the removal of zinc by the method of this invention from ammoniacal solutions containing both dissolved zinc and dissolved copper, distillation of the solutions at lower temperatures, such as are feasible under sub-atmospheric pressures, favors the formation of a soluble azurite type of copper compound, rather than an insoluble malachite type of copper compound. Thus, the use of a vacuum distillation technique for the elimination of a substantial part of the total ammonia content retains the copper in solution while achieving an equilibrium which necessitates precipitation of a large part of the zinc from the solution. This is due to the fact that relatively greater proportions of ammonia than of carbon dioxide are driven off by distillation at lower temperatures, i.e. under a vacuum, while the reverse occurs and relatively more carbon dioxide is driven off when the distillation is carried out at atmospheric pressure.

To get the soluble blue copper compound which seems to be similar to azurite in composition, as distinct from the insoluble malachite type compound, the following stoichiometric transformtion must take place:

$$3Cu(NH_3)_4CO_3 + 12H_2O \rightarrow Cu(OH)_2 \cdot 2CuCO_3 + (NH_4)_2CO_3 + 10NH_4OH$$

And to get the compound which seems, in view of its relative insolubility, to approach malachite in composition, the following transformation must occur:

$$2Cu(NH_3)_4CO_3 + 8H_2O \rightarrow Cu(OH)_2 \cdot CuCO_3 + (NH_4)_2CO_3 + 6NH_4OH$$

Therefore, in the azurite type transformation shown by the first equation above:

$$Cu(NH_3)_4CO_3 + 4H_2O \rightarrow \tfrac{1}{3}Cu(OH)_2 \cdot \tfrac{2}{3}CuCO_3 + \tfrac{1}{3}(NH_4)_2CO_3 + 3.33NH_4OH$$

And in the malachite type transformation shown in the second equation above:

$$Cu(NH_3)_4CO_3 + 4H_2O \rightarrow \tfrac{1}{2}Cu(OH)_2 \cdot \tfrac{1}{2}CuCO_3 + 0.50(NH_4)_2CO_3 + 3.00NH_4OH$$

Therefore, as shown by the above equations, in the distillation operation at least 0.17 mole less of $CO_2$ must be taken off for every 4 moles of $NH_3$ extracted; i.e. in order to hydrolyze the copper ammonium compound to the azurite type product, only ⅓ of a mole of $CO_2$ must be driven off for every 4 moles of $NH_3$ extracted, whereas in order to obtain the malachite type of compound, ½ mole of $CO_2$ must be extracted for every 4 moles of $NH_3$. Thus, the relatively more rapid rate of elimination of ammonia than carbon dioxide under vacuum distillation favors the formation of the soluble blue azurite compound rather than the insoluble green malachite compound. The copper compounds formed under certain conditions in carrying out the method of this invention with ammoniacal solutions containing both zinc and copper may not have the exact compositions that the literature gives for the minerals azurite and malachite. However, the compositions of the copper compounds formed, in view of their color and solubilities, probably approaches the compositions of these two minerals.

In this case of zinc, in carrying out the method of this invention two reactions can take place, namely:

(1) $Zn(NH_3)_4CO_3 + 4H_2O \rightarrow Zn(OH)_2 + (NH_4)_2CO_3 + 2NH_4OH$ (2) $Zn(NH_3)_4CO_3 + 4H_2O \rightarrow ZnCO_3 + 4NH_4OH$ In fact, both of these reactions must occur in order to yield the basic zinc carbonate which is gotten upon vacuum distillation and cooling, i.e. $Zn(OH)_2 \cdot ZnCO_3$.

As can be seen, the reactions above for both copper and zinc constitute a hydrolysis of the copper and zinc ammonium compounds followed by the elimination of ammonia and carbon dioxide. In order to precipitate only the basic zinc carbonate, the distillation is stopped before any copper compounds present hydrolyze to any great extent. As the above equations show, the concentration of carbon dioxide appears to control the equilibrium of the hydrolysis. And for the above reasons, the use of vacuum distillation more readily produces the desired equilibrium than does distillation at atmospheric pressure. This is demonstrated by the experimental results obtained.

In carrying out the method of the invention, a zinc ammonium carbonate leach recycle solution, containing dissolved zinc as well as dissolved free ammonia and dissolved compounds of other metals, is treated to drive off ammonia until its total ammonia content is substantially reduced. The ammonia content of the solution is reduced sufficiently to precipitate a zinc carbonate without any accompanying precipitation of copper. The term "total ammonia" includes all ammonia available for combination with the carbon dioxide content of the solution and all ammonia dissolved per se or as ammonium hydroxide in the solution, and also includes any ammonia present in complex combination with zinc. The recycle liquor so treated usually contains at least 150 grams per liter of dissolved total ammonia and at least 120 grams per liter of dissolved carbon dioxide and at least 30 grams per liter of one other metal, such as copper, which forms water-soluble complex compounds with ammonia, in addition to at least 30 grams per liter of zinc. However, the method of this invention is applicable to solutions whose compositions vary widely from these values, as has been shown.

The reduction of the total ammonia content of the solution is preferably carried out by vacuum distillation at an elevated temperature, preferably under 85° C. and above 30° C. The ammonia gas driven off is reused at other points in the leaching operation. Vacuum distillation at a sub-atmospheric pressure of less than one-half an atmosphere (say about ⅐ of an atmosphere) and at a temperature of about 50° C. has been found to be an advantageous procedure for the removal of ammonia from recycle solutions. Agitation of the liquor under vacuum accompanied by bubbling of air through the liquor, with or without heating, may be used under some circumstances, although it is a slower procedure than vacuum distillation.

It is advantageous to perform the ammonia elimination operation as rapidly as is feasible.

While employing a vacuum of the character above described, steam may be admitted for the purpose of heating the liquor to the desired temperature. Although this increases the water content of the system, this distillation by steam while employing a vacuum at the same time gives a greater extraction of zinc with a lower copper content. For example, one liter of recycle liquor containing 50 g./l. zinc was vacuum distilled for 1 hour at 70° C. with the following results:

|  | Vol. or Wgt. | Cu | NH$_3$ | CO$_2$ | Zn |
|---|---|---|---|---|---|
| Head Sample | 1,000 cc | 61.6 g./l | 148 g./l | 144 g./l | 49.7 g./l. |
| Filtrate after 1 hr. dist. | 850 cc | 67.5 g./l | 56.8 g./l | 42.4 g./l | 21.6 g./l. |
| Zinc Cake Analysis |  | 0.6% | .01% | 6.1% | 69.2%. |

Zinc extraction 63.0%.

Also it has been found that higher extraction results in smaller amounts of copper impurity if the vacuum distillation is carried out within the temperature ranges cited with a leach liquor that contains a considerable amount of cuprous copper; for example, leach recycle liquor that contains a complex compound of cuprous copper with ammonia and carbon dioxide. The reason for this is that the cuprous ammonia complex is more stable than the cupric complex under these conditions. To cite one example:

| Sample | Vol. or Wgt. | Total Cu | Cuprous Cu | NH$_3$ | CO$_2$ | Zn |
|---|---|---|---|---|---|---|
| Head | 1,000 cc | 75.1 g./l | 40.7 g./l | 144.3 g./l | 12.1 g./l | 50.7 g /l. |
| Filtrate | 550 cc | 91.9 g./l |  | 79.4 g./l | 84.1 g./l | 27.2 g./l. |
| Zinc Cake Analysis. | 54 g | 0.17% |  | .01% | 13.7% | 60.6%. |

The driving off of total ammonia may be carried out at a solution temperature below about 85° C., preferably between 30° C. and 75° C. At temperatures from 20° C. to 70° C., leach solutions tend to lose ammonia gas somewhat more rapidly than carbon dioxide gas. At temperatures of from 70° C. to 85° C., leach solutions lose ammonia and carbon dioxide gas at about equal rates. At temperatures of about 85° C. to 95° C. or higher, leach solutions tend to lose carbon dioxide gas preferentially, rather than ammonia gas. The fact that ammonia is driven off relatively more readily than carbon dioxide at lower temperatures is shown by the following table:

| Run | Temp., ° C. | Time, hrs. | Percent Tot. NH$_3$ off | Percent Tot. CO$_2$ off |
|---|---|---|---|---|
| Z.R. 4, air agit | 60 |  | 40 | 12 |
| Z.R. 7, air agit | 50–60 | 1 | 34 | 24 |
| Z.R. 8, heating | 92 |  | 34 | 47 |
| Z.R. 9, air agit | 50–60 | 1 | 25 | 5.4 |
| Z.R. 10, air agit | 50–60 | 2 | 29 | 8.0 |
| Z.R. 11 vac | 25 | ½ | 23 | 9.4 |
| Z.R. 13, vac | 20–35 | 2 | 38 | 25 |
| Z.R. 16, vac | 45–55 | 1 | 43 | 30 |
| Z.R. 19, vac | 70–75 | ½ | 70 | 63 |
| Z.R. 20, vac | 70 | ½ | 55 | 54 |

Inasmuch as the method of this invention is assigned to at least avoid reducing the carbon dioxide content of the solution to any greater extent than the percentage of reduction of the ammonia content of the solution, and, preferably to reduce the ammonia content of the solution to a greater extent than the carbon dioxide content in order to obtain a maximum precipitation of zinc carbonate, the temperature at which the ammonia content reduction treatment is carried out preferably should not exceed 85° C.

After reducing the total ammonia level of the leach solution to an amount sufficient to retain any additional dissolved metal, such as copper, in solution, but insufficient to retain all of the zinc in solution, the solution is cooled. This results in precipitation of a substantial porton of the zinc content of the solution free of any large quantities of coprecipitated ammonium carbonate and substantially free of other metallic compounds. While at least 30% of the zinc content of zinc ammonium carbonate leach solution can be thus removed, the precipitation of a zinc carbonate can be increased by a mild carbonation of the solution, which may or may not be cooled, from which a portion of the free ammonia has been eliminated. Such a mild carbonation may be carried out merely by bubbling carbon dioxide gas through the solution, or by introducing carbon dioxide gas into contact with solution under a superatmospheric pressure of say 15 to 30 pounds per square inch for a period of say ½ hour or so.

In carrying out the method of this invention with leach recycle solutions from the leaching of material containing both zinc and copper, a portion of the copper content of the solution having been precipitated as metallic copper by gas reduction with carbon monoxide or other reducing gas at an elevated temperature and pressure, it has been found to be advantageous to allow the leaching operation to build up a sufficient zinc concentration in the pregnant liquor so that a relatively large amount of pure, copper-free zinc may be precipitated by the method of this invention. Therefore, it is best to allow the leaching to proceed to the extent that 30 grams or more of zinc per liter will be built up in the solution. Under some circumstances with materials having a low zinc content in comparison to their content of additional metals, such as copper, it may be necessary to recycle the leach solution through several leaching and gas reduction operations before the method of this invention is applied to it to remove a portion of its zinc content.

With a leaching circuit that gives higher zinc contents, say more than 30 grams of zinc per liter, it is easier to precipitate a substantial portion of the zinc content free from compounds of other metals present in the solution while allowing say 10 to 20 grams per liter of zinc to remain in this solution and to be recycled back to the leach tank. A substantial buildup of zinc content allows the method of this invention to be applied to reduce, for example, a copper-zinc ratio of 70–50 grams per liter down to a ratio of 70–20 grams per liter while precipitating 30 grams of a pure zinc carbonate, whereas the treatment of a liquor having a copper-zinc ratio of 70–30 grams per liter to reduce the ratio to 70–20 grams per liter would only result in the precipitation of some 10 grams of a pure zinc carbonate. However, while it is advantageous to allow the buildup of a high zinc content, it is not essential in carrying out the method of this invention.

The following examples illustrate an advantageous procedure for removing zinc from ammoniacal leach recycle liquors according to the method of this invention.

*Example I*

Recycle liquor from a brass scrap leaching operation, part of whose copper contact had been removed, was vacuum distilled at a temperature of 70 to 75° C. for ½ hour. Prior to vacuum distillation the liquor had an ammonia content of 152.6 grams per liter, a carbon dioxide content of 153 grams per liter, a copper content of 69.5 grams per liter, and a zinc content of 46.5 grams per liter. During distillation the volume of the liquor was reduced about 50%. After distillation there remained in the reduced volume of liquor some: 105 grams of ammonia per liter of liquor, 110.8 grams of carbon dioxide per liter of liquor, 79.3 grams of copper per liter of liquor and 41.2 grams of zinc per liter of liquor. A cake was precipitated during the distillation, which after washing gave an analysis of 0.324% copper, 8.8% ammonia and the remainder basic zinc carbonate. Some 45% of the original total zinc content of the liquor was removed in the form of this cake.

*Example II*

A batch of leach recycle liquor was distilled for approximately ½ hour at about 70° C. under a vacuum. The precipitate thrown down during this operation was filtered out and washed and dried. The original recycle liquor contained 134 grams of ammonia per liter, 147 grams of carbon dioxide per liter, 66.2 grams of copper per liter and 44.6 grams of zinc per liter. After distillation, the reduced liquor volume contained 101.1 grams of ammonia per liter, 110.8 grams of carbon dioxide per liter and 41.9 grams of zinc per liter. The volume of the liquor was reduced about 40% in the course of the distillation operation. Some 42.7% of the total original zinc content was recovered in the form of a white cake which upon analysis had a copper content of 0.4%, an ammonia content of 10.5% and the balance substantially all basic zinc carbonate.

*Example III*

A quantity of recycle liquor was vacuum distilled over ½ hour at 85° C. At the end of this operation, the solution was rapidly cooled and the white cake thrown down was filtered out and washed and dried. The liquor had an initial ammonia content of about 160 grams per liter and an initial zinc content of about 45 grams per liter. After distillation the liquor had an ammonia content of approximately 100 grams per liter and a zinc content of approximately 27 grams per liter. Some 40% of the original total zinc content of this batch of recycle liquor was removed in the form of a pure white cake.

*Example IV*

A quantity of leach recycle liquor was vacuum distilled at a temperature of 45 to 55° C. for one hour. The liquor was then gradually cooled to 25° C. and the white precipitate filtered out and washed and dried. The liquor originally had an ammonia content of 163 grams per liter, a carbon dioxide content of 144 grams per liter, a copper content of 68 grams per liter, and a zinc content of 60 grams per liter. After distillation the ammonia content of the liquor was 107.8 grams per liter, with a carbon dioxide content of 119 grams per liter, a copper content of 80 grams and a zinc content of 49 grams per liter. The volume of the solution was decreased about 20% during the distillation. About 33% of the original zinc content was removed as a white cake. The water employed for the initial washing of this cake analyzed 4.8 grams of copper per liter, 7.2 grams of ammonia per liter, 7 grams of carbon dioxide per liter, and 2 grams of zinc per liter. However, the water employed in the second washing of the cake upon analysis gave nil contents of copper, ammonia, carbon dioxide and zinc.

*Example V*

A quantity of recycle liquor was heated at about 30 to 35° C. under a sub-atmospheric pressure for two hours. The liquor originally contained about 163 grams of ammonia per liter, 143 grams of carbon dioxide per liter, 68 grams of copper per liter and 115 grams of zinc per liter. After the heating, which reduced the volume of the liquor approximately 25%, the liquor had an ammonia content of 134.5 grams per liter, and a carbon dioxide of 144 grams per liter, a copper content of some 85 grams per liter and a zinc content of about 75 grams per liter. Some 51% of the total original zinc content was filtered out and washed and dried as a white cake.

*Example VI*

A quantity of leach recycle liquor was heated to about 60° C. and agitated while air was bubbled through it. This was continued for one hour and then the solution was cooled to 25° C. Carbon dioxide gas was then bubbled through the cooled solution for one hour. The resulting white precipitate was filtered out and washed and dried. The solution initially contained 163 grams of ammonia per liter, 143 grams of carbon dioxide per liter, 66.5 grams of copper per liter, and 70.5 grams of zinc per liter. After agitation and air bubbling, the clear supernatant solution contained 130.0 grams of ammonia per liter, 127.0 grams of carbon dioxide per liter, about 110 grams of copper per liter and some 70.2 grams of zinc per liter. After carbon dioxide had been bubbled through the solution, for one hour, the ammonia content of the solution was 120.7 grams per liter, the carbon dioxide content was 134.0 grams per liter and the zinc content (filtrate) was 45.0 grams per liter. The precipitate when washed and dried was equivalent to about 68% of the original total zinc content of the solution.

*Example VII*

Recycle liquor was heated to 50 to 60° C. and air was bubbled through the solution with agitation for one hour. The solution was then cooled and carbonated in an autoclave at 15 to 30 pounds per square inch of carbon dioxide gas for one hour. The precipitate was then filtered out and washed and dried. This product represented a zinc removal of about 85% of the original zinc content of the solution. Prior to the agitation and carbonation, the liquor contained 152 grams of ammonia per liter, 148 grams of carbon dioxide per liter, 69 grams of copper per liter and 70 grams of zinc per liter. After carbonation and filtration the solution contained 108.9 grams of ammonia per liter, 172 grams of carbon dioxide per liter, 61.9 grams of copper per liter and 13.3 grams of zinc per liter.

The temperature range for the elimination of ammonia by vacuum distillation or otherwise of 30° C. to 85° C. has been selected as a preferable range although temperatures outside this range may be employed. Generally, the temperature employed is elevated, i.e. is above room temperature, and must be such as to achieve a rather rapid rate of ammonia elimination. It was found that vacuum distillation at about 60–70° C. and under a sub-atmospheric pressure of less than ½ an atmosphere was the most efficient procedure for carrying out the method of the invention. Carbonation is not necessary with such a procedure, but the step of cooling the solution down to, say 20 to 25° C., upon completion of distillation, is important when vacuum distillation is employed and should be carried out rapidly.

It should be noted that with recycle liquors having a relatively low copper content, say 35 to 40 grams per liter, and more than 30 grams per liter of zinc, it is possible to carry the elimination of ammonia by vacuum distillation to a point where 95% of the total zinc may be precipitated as a basic carbonate without coprecipitation of excessive amounts of copper.

This application is a continuation of my earlier application Serial No. 319,781, filed November 10, 1952, and now abandoned.

I claim:

1. A method for the removal of pure compounds of zinc from a solution of zinc ammonia carbonate containing at least 30 grams of dissolved zinc per liter of solution and at least one additional non-ferrous metal capable of forming a soluble ammonia complex and dissolved ammonia in excess of that required to hold said zinc and additional metal in solution, which comprises placing the solution under a sub-atmospheric pressure of less than about ½ atmosphere, heating the solution while it is under said sub-atmospheric pressure to an elevated temperature between 30° C. and 85° C. for a sufficient length of time to reduce the total ammonia content sufficiently to cause precipitation of only a part of the total zinc content as pure zinc carbonate free from said additional metal upon cooling the solution but insufficient to cause precipitation of said additional metal compound.

2. The method of claim 1 in which an additional metal is present in an amount of at least 30 grams per liter of solution.

3. The method of claim 2 in which an additional metal is copper.

4. The method of claim 1 in which at least one of the additional metals is copper.

5. The method of claim 1 in which carbon dioxide is introduced into contact with the cooled solution in a sufficient amount to precipitate a substantial proportion but not all of the dissolved zinc content of the solution as a pure zinc carbonate.

6. The method of claim 1 in which the heated solution is cooled to selectively precipitate pure zinc carbonate.

References Cited in the file of this patent

UNITED STATES PATENTS

| | | |
|---|---|---|
| 2,695,843 | Schaufelberger et al. | Nov. 30, 1954 |
| 2,698,220 | Erskine | Dec. 28, 1954 |
| 2,805,918 | Van Hare et al. | Sept. 10, 1957 |

FOREIGN PATENTS

| | | |
|---|---|---|
| 525,023 | Canada | May 15, 1956 |